United States Patent [19]

Hoover, deceased

[11] 4,387,801

[45] Jun. 14, 1983

[54] CONVEYOR BELT

[75] Inventor: Merle L. Hoover, deceased, late of Franklin, Pa., by Nancy S. Hoover, executrix

[73] Assignee: Joy Manufacturing Company, Pittsburgh, Pa.

[21] Appl. No.: 224,419

[22] Filed: Jan. 12, 1981

Related U.S. Application Data

[63] Continuation of Ser. No. 69,664, Aug. 24, 1979, abandoned.

[51] Int. Cl.³ .................... B65G 15/08; B65G 15/34
[52] U.S. Cl. ............................. 198/821; 198/824; 198/847
[58] Field of Search .................... 198/337, 820–821, 198/824, 833, 838, 847, 849, 834; 474/237

[56] References Cited

U.S. PATENT DOCUMENTS 4,061,223 12/1977 McGinnis .......................... 198/821

Primary Examiner—James G. Smith
Assistant Examiner—Douglas D. Watts
Attorney, Agent, or Firm—Raymond W. Augustin

[57] ABSTRACT

An improved endless flexible conveying element is set forth. The flexible conveying element is of the type adapted to be mounted on a carrier and to conform with a generally curvilinear endless path for orbital traverse of such endless path. The conveying element has an elongated resiliently deformable portion which includes a longitudinally extending portion located laterally intermediate the longitudinal extending side portions thereof. The resiliently deformable portion of said conveying element laterally flexes to permit the belt to follow laterally curvilinear portions of the endless path in an upright position. The resiliently deformable portion has a tendency to spontaneously assume a natural form thereof, which is configured such that the resiliently deformable portion, when mounted on the carrier, is deformed from its natural form in a manner to provide in the side portions a condition of relative longitudinal tension with respect to the central portion. This tension is substantially continuously maintained throughout such lateral flexing of the resiliently deformable portion of the conveying element.

19 Claims, 7 Drawing Figures

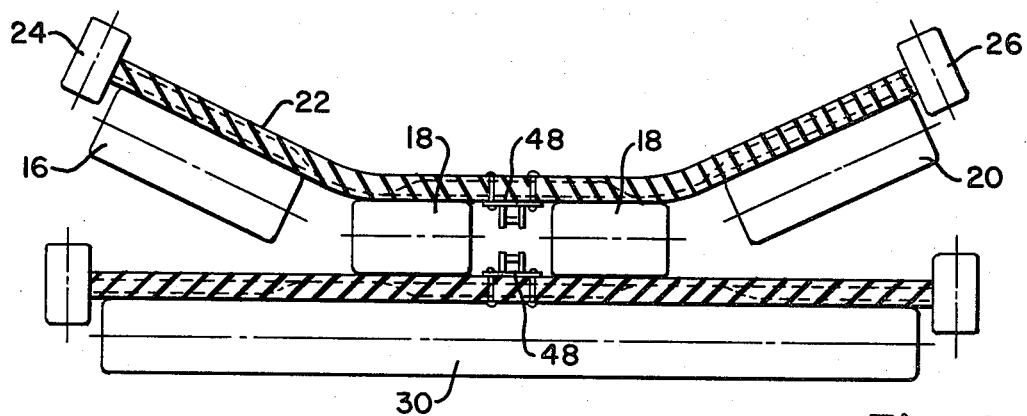
Fig. 4
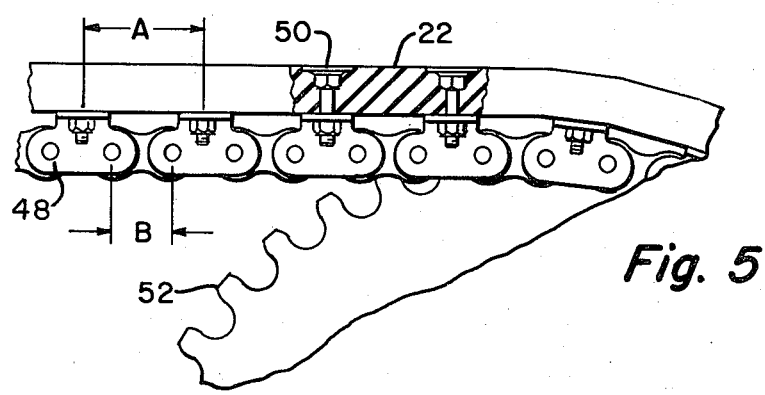
Fig. 5
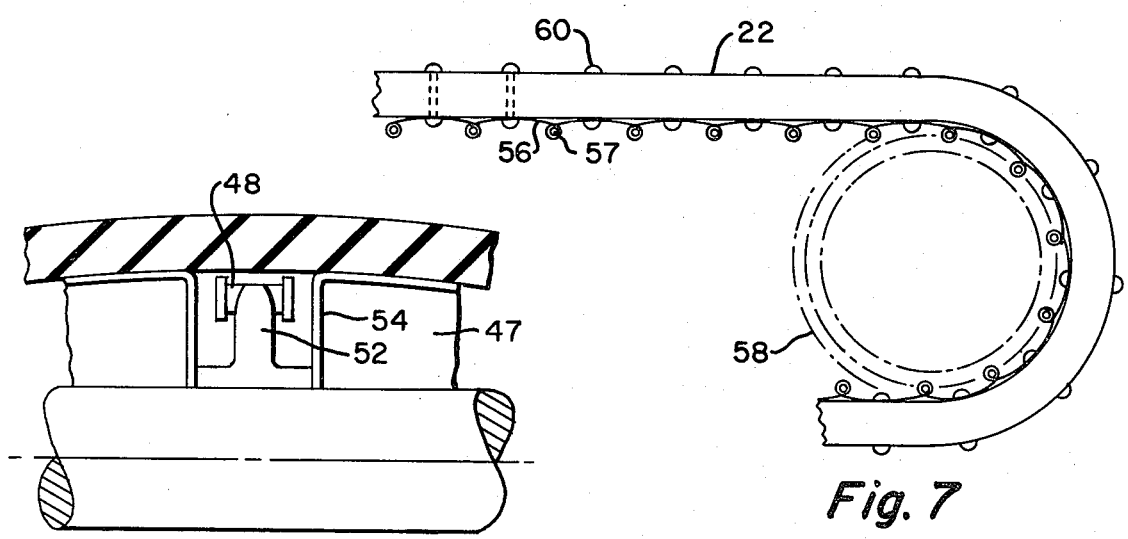
Fig. 6
Fig. 7

CONVEYOR BELT

This is a continuation, of application Ser. No. 069,664, filed Aug. 24, 1979, now abandoned.

BACKGROUND OF THE INVENTION

The present invention relates to stretchable conveyor belts, usually of reinforced elastomer construction and which commonly have a troughed conveying reach that defines an upwardly opening, longitudinally extending concavity.

Prior belts of this type have employed centrally-located, inextensible tension elements such as cables to transmit the required driving tension, and pleats or flutes molded in the edges of the belt which fold or unfold as required to accommodate elongation or shortening of the belt edges as it passes through horizontal turns. Such prior belts have been subject to various disadvantages. For example, the flutes in such belts increase the cost of the mold in which the belt is formed as well as the quantity of material used in manufacturing the belt. Material conveyed by the belt will tend to stick in the grooves between adjacent flutes and will drop out when the belt is inverted on its return run to cause excessive carry-back or spillage. Additionally, belt idlers running on the flutes are a source of noise and excess wear, and when the belt runs over a terminal drum or pulley the flutes must elongate excessively. These excess elongations in the flutes are about twice the average belt edge elongation and result in early fatigue failures of the belt material.

U.S. Pat. No. 4,061,223 discloses a belt conveyor system in which a troughed conveyor belt intended to negotiate horizontal turns is provided with reinforcing members extending transversely of the belt and spaced apart longitudinally of the belt. Resilient, deformable material is provided between the reinforcing members to permit stretching of the belt upon installation thereof such that the belt edges remain in tension when the belt passes around curves. The transverse reinforcements help to maintain the molded shape of the belt in such curves. This belt also exhibits certain disadvantages. For example, the belt requires a separate drive element disclosed as a drive or power belt which contacts the conveyor belt to transmit driving tension thereto. As the belt is stretchable an indeterminate amount, it is not possible to apply pulling or driving tension thereto at a single point without further stretching the belt. Such additional stretching is uncontrolled and may vary depending upon physical dimensions of the belt, the material load on the belt and the properties of the material from which the belt is formed. Thus, this belt may not be driven by conventional conveyor belt drives, nor may it be installed on conventional supports as it relies on variable spacing between the terminal pulleys to provide the desired belt stretching.

SUMMARY OF THE INVENTION

In accordance with the present invention, an improved belt conveyor is provided which can negotiate horizontal curves without edge collapse because the edges of the belt are prestretched at installation to remain in longitudinal tension when the belt passes around such horizontal curves. In one embodiment of the invention, and in contrast to the belt conveyor disclosed in the cited U.S. Pat. No. 4,061,223, only the edges of the belt are subjected to the controlled prestretching while the central portion of the belt intermediate the edges is not stretched. This may be achieved by curing the belt in a formed mold such that the belt edges are shorter than the transversely central portion thereof. More specifically, the formed mold incorporates a double curvature whereby each belt section is molded as a troughed form having both a transverse and a longitudinal curvature. By judicious selection of the belt trough depth and the longitudinal curve radius, a predetermined prestretch on the order of approximately 10%, for example, may be induced in the edges of the belt when the belt is flattened at installation. Accordingly, when passing through a horizontal curve the outside edge of the belt will be stretched an incremental amount over the prestretch and the inner edge will relax by a similar incremental amount. This prevents buckling of the inner belt edge as the prestretch imposed thereon at installation is sufficient to maintain some residual stretch in this edge of the belt as it passes through the horizontal curve. In another embodiment of the invention, controlled prestretching of the belt is achieved by riveting or otherwise fastening the belt to a chain which has a predetermined freeplay provided, for example, by loose chain link pivot connections. The resulting variable chain pitch permits the chain to elongate and stretch the belt attached thereto.

Further, and in accordance with the invention, transverse reinforcing members may be incorporated into the belt to provide better belt flexure at the junction between sloping sidewall portions and a central, normally-flat portion of the troughed belt configuration. This is achieved by providing plural upper and lower transverse reinforcing members in the belt, the upper reinforcing members being recessed at the junction between the sidewall portions and the central portion so as to minimize resistance to flattening of the belt as it passes around a terminal drum and travels through its return run.

Advantages of the improved belt include the capability to provide a predeterminable, controlled and limited prestretch in a conveyor belt at installation. The belt may be installed on conventional supports and driven by conventional drive means. In addition, the need for edge pleats in the belt is obviated. These and other objects and features of the invention are more fully described in the following specification taken in conjunction with the accompanying figures in which:

FIG. 4 is a cross-sectional view, similar to that of FIG. 1, showing an alternative embodiment of the invention wherein the prestretchable belt includes a chain attached thereto;

FIG. 5 is a partially broken-away side view of the embodiment of FIG. 4;

FIG. 6 illustrates an alternative embodiment of the invention shown in FIGS. 4 and 5; and FIG. 7 illustrates still another embodiment of the invention.

Figure 1:
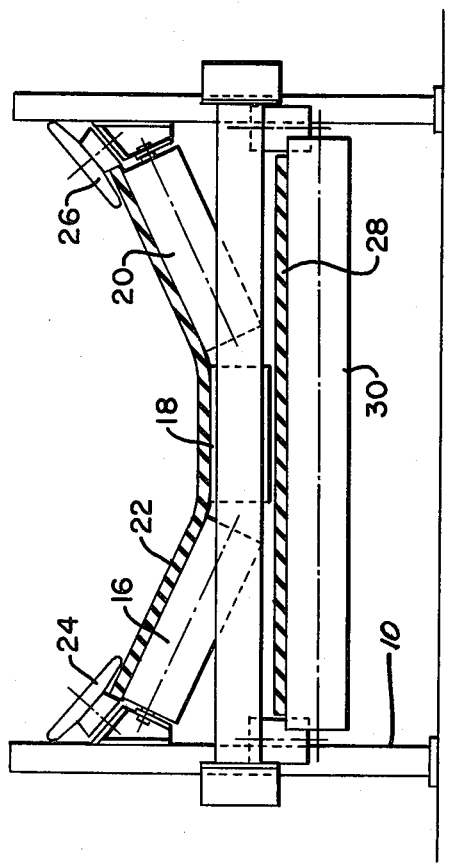
FIG. 1 is an elevational cross-sectional view of the invention showing the manner in which the conveyor belt is supported.

With reference now to FIG. 1, one of a plurality of stationary frames 10 is shown as including idler rollers 16, 18, 20, 24, 26 and 30 which support conveying and return traverses of a conveyor belt 22 in the conventional manner.

Figure 2:
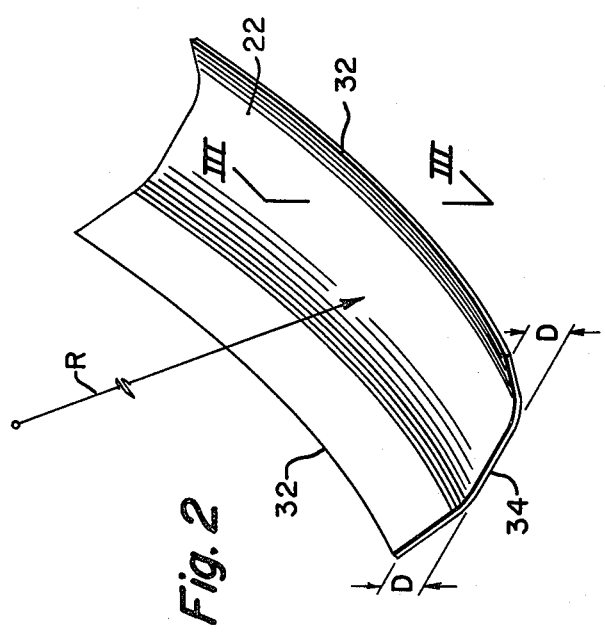
FIG. 2 is an elevational view of one embodiment of the invention wherein the conveyor belt is molded in a particular novel form.
Figure 3:
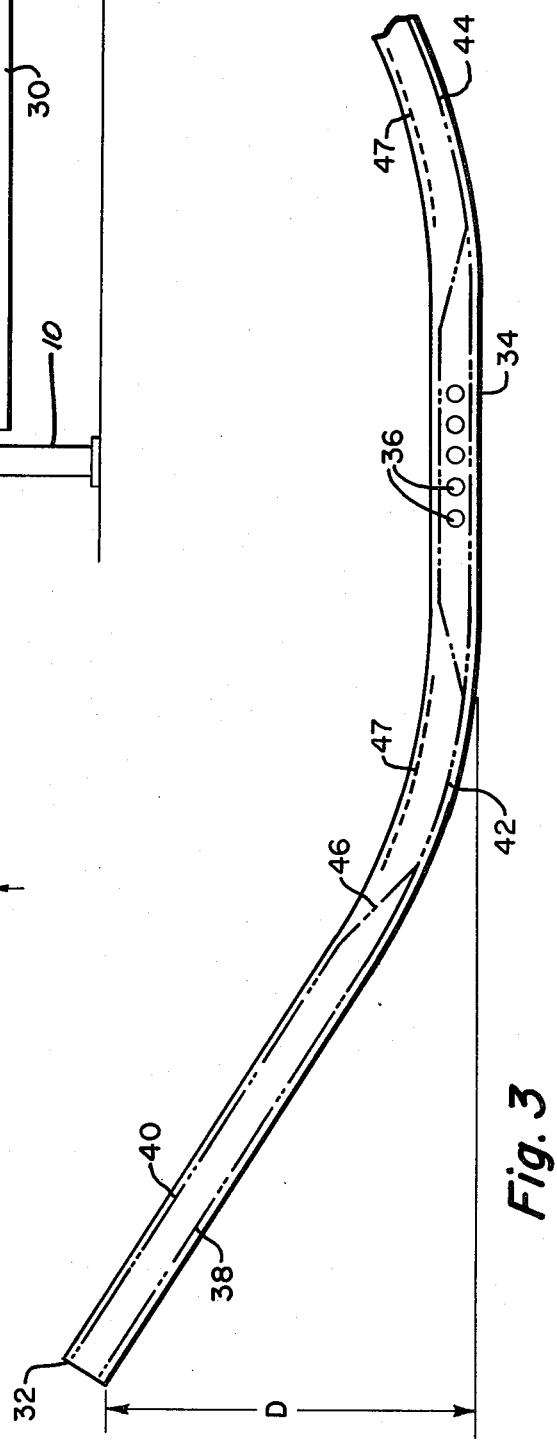
FIG. 3 is a cross-sectional view taken on line III—III of FIG. 2 and showing means for permitting improved flexure of the belt.

As shown in FIGS. 2 and 3, conveyor belt 22 may be molded by conventional molding techniques in elongated sections having a transverse extent 34 intermediate longitudinal edge portions 32 thereof. Each belt section may be as long as handling and installation convenience considerations permit. For example, belt sections up to or exceeding approximately 200 feet are contemplated. The opposite longitudinal ends of each such belt section are adapted to be secured to similar end portions of other belt sections to form endless belt 22. The belt 22 is so molded as to have an upwardly opening concavity across its width as well as an upward curvature along its length. In this manner edge portions 32 of each belt section will be of shorter radius and will be shorter in length than the central belt portion 34 intermediate the edges 32 such that when the belt section is straightened or flattened, a controlled and predetermined pre-stretch will be imposed on the edges 32 without the application of longitudinal tension to central portion 34. The edge tension is sufficient to prevent a slack condition in the inner side of the assembled belt 22 as it traverses a horizontal curve as described above in that, even though in a curve the prestretch in the inner edge of the belt will relax incrementally, sufficient prestretch nevertheless will remain to maintain the inner edge in tension and prevent edge buckling.

It has been found that for normally satisfactory prestretching of belt edges 32 as disclosed hereinabove the longitudinal radius of curvature R of the central portion of the belt section shown in FIG. 2 preferably should be approximately eleven times the depth D of the trough formed by the transverse concavity of the belt for a typical belt width of 36 inches. The radius R may be a greater or lesser multiple of depth D as required by the geometry of the belt and by its use environment. For example, the ratio $R/D=11$ provides approximately 10 percent prestretch in the belt edges when the belt is flattened. It is believed that approximately one third of this initial prestretch becomes a permanent "set" or elongation of the belt edges, and the remaining 6-7 percent prestretch is sufficient for normal use environments. While the limiting values of R/D are not precisely known it will be appreciated that they are dependent on any number of belt and installation parameters including but not limited to maximum belt turn radius, belt construction, belt loading, and the like. It is believed that typically a maximum edge prestretch of approximately 15 percent may not be exceeded without producing excess belt wear, unduly large side loads on the installation and greater belt drive energy requirements. Similarly, a minimum belt edge prestretch of approximately 3-4 percent is believed necessary to prevent edge buckling under normal belt loading conditions on the smallest anticipated radius belt turns.

For installation of belt 22 of FIG. 2 a plurality of the belt sections are secured together end-to-end and installed as an endless loop on conventional supports such as shown in FIG. 1. As the belt sections are flattened upon installation (i.e., radius R effectively becomes infinitely large) a longitudinal prestretch is induced in the edge portions 32 and the belt edges are thus maintained in longitudinal tension. Typically the edge portions 32 of the entire belt will be maintained in tension as both the conveying and return traverses of the belt will be longitudinally flattened. The amount of prestretching is determined by the mold configuration and is independent of the structure of the support means on which the belt is to be installed.

Instead of or in addition to pre-stretching only edges 32 of belt 22 of FIG. 2 by molding sections thereof in the disclosed doubly curved mold, it is possible to pre-stretch belt 22 by means of a tension element shown as a chain 48 in FIGS. 4 and 5. Elements in FIG. 4 which correspond to those of FIG. 1 are identified by like reference numerals. In this case a chain 48 having individual links is secured to the underside of belt 22 by means of flathead bolts 50 (FIG. 5). The chain 48 is manufactured with a controlled longitudinal free play which is provided, as shown, by loose pivot connections so that the dimensions B shown in FIG. 5 can vary, for example, in the range of approximately 0.95 B to 1.05 B (i.e., approximately 10% looseness between the adjacent links). As will be understood, B is the nominal dimension between the pivot pin-receiving apertures in adjacent links. As these apertures are larger in diameter than the pins themselves, the dimension B can vary approximately 10% as explained above. Among other things, this provides chain 48 a sufficient horizontal flexibility to accommodate passage thereof through horizontal curves and also allows easy plant assembly of chain 48 to belt 22. Dimension A is the dimension between adjacent chain apertures by which chain 48 is attached to belt 22, and as shown is nominally twice the dimension B. As such, dimension A is also capable of variation in conjunction with the above described variation of B. Accordingly, as the nominal B varies between 0.95 B and 1.05 B, the nominal dimension A, which preferably equals about twice the nominal dimension B, varies between 0.95 (2B) and 1.05 (2B). Thus, A equals 1.9 nominal B for the minimum dimension B and 2.1 nominal B for the maximum dimension B.

Holes for receiving bolts 50 are formed in the belt 22 at a spacing A which equals approximately 1.9 nominal B, for example, with belt 22 unstretched. Belt 22 is thus secured to chain 48 by means of bolts 50 with nominal $A=1.9\ B$ and nominal $B=0.95\ B$. In short, the links of chain 48 are "pushed together" for attachment to belt 22. When the belt and chain assembly is installed on supports 10, the length used is approximately 90% of the total length required with the result that to attach the ends of the belt and chain assembly together, it must be stretched 10% as permitted by the loose pin connections. After belt installation the dimension B equals 1.05 nominal B and the dimension A equals 2.1 nominal B. In other words, when belt 22 is installed on supports 10, the links of chain 48 are pulled apart by the maximum increment permitted by the described freeplay, and belt 22 is correspondingly stretched a controlled amount. Because belt 22 cannot be stretched beyond the limits of the chain freeplay, the prestretching thereof is controlled and strictly limited to a predetermined maximum amount independent of the support means on which the belt is installed.

The loose pin connections also provide for chain 48 a degree of pitch length adjustment as the belt and chain assembly passes around a terminal drum or sprocket such as sprocket 52 in FIG. 5, depending upon the structure of the drum or sprocket and the belt drive arrangement. For example, in FIG. 6 there is shown a terminal drum assembly 47 wherein the drive sprocket 52 for the chain 48 is disposed laterally intermediate encircling drums 54 which are larger in diameter than the sprocket 52. The belt is thus in friction driving engagement with drum 54 and sprocket 52 merely guides the chain 48. The desired chain pitch adjustment is possible since the teeth of sprocket 52 do not apply driving tension to chain 48.

In FIG. 7, an alternative embodiment of the invention is shown for use in conjunction with the driving arrangement of FIG. 6, wherein chain 48 is replaced by spring-like elements 56 having overlapping, cooperating hinge elements 57 fitted with loose pins which allow a controlled prestretching of belt 22 in a manner similar to the loose pin structure described above. In this case, spring elements 56 are attached to belt 22 by rivets 60 or the like with the spring elements 56 being pushed together. These are then pulled apart upon belt installation to prestretch belt 22 a predetermined, limited amount as described hereinabove.

Although only certain specific embodiments of the invention have been described herein, it will be readily apparent to those skilled in the art that various other modifications may be made to suit requirements without departing from the spirit and scope of the invention. For example as shown in FIG. 3, any embodiment of the belt disclosed herein may be provided with central, longitudinally-extending reinforcing cables 36 and/or lateral reinforcements such as reinforcing wires 38 and 40, sets of these wires being spaced longitudinally along the length of the belt. Wires 38 and 40 define the hinge areas 42 and 44 between the sloping side walls and the bottom of the trough-shaped belt, where the upper reinforcing wire 40 is bent downwardly as at 46 so as to be adjacent the lower wire 38. No reinforcing is needed in this area; and, since the upper wire 40 is bent downwardly in the areas 46, it does not impede flattening of the belt on the lower or return reach of the conveyor. If desired, cloth reinforcing 47 can be used in the curved, hinge portions 42 and 44. The inventor having contemplated these and other embodiments and modifications, it is intended that the invention be construed as broadly as permitted by the scope of the claims appended hereto.

It is claimed:

1. In an endless flexible conveying element adapted to be mounted on a carrier means to conform with a generally curvilinear endless path for orbital traverse of such endless path and wherein an elongated resiliently deformable portion of said conveying element includes a longitudinally extending central portion located laterally intermediate longitudinally extending side portions thereof and said resiliently deformable portion laterally flexes to permit traverse thereby of laterally curvilinear portions of said path in an upright orientation, the improvement comprising:
said resiliently deformable portion having an innate tendency to spontaneously assume a natural form thereof which is configured such that said resiliently deformable portion, when mounted on such carrier means, is deformed from said natural form in a manner to provide in said side portions a condition of relative longitudinal tension with respect to said central portion which is substantially continuously maintained throughout such lateral flexing of said resiliently deformable portion.

2. The improvement as claimed in claim 1 wherein said resiliently deformable portion, when mounted on such carrier means, is deformed from said natural form in a manner that said side portions are resiliently elongated with respect to said central portion.

3. The improvement as claimed in claim 2 wherein the magnitude of the resilient elongation of said side portions is limited to a predetermined maximum resilient elongation.

4. The improvement as claimed in claim 3 wherein said maximum resilient elongation is approximately 15 percent elongation.

5. The improvement as claimed in claim 2 wherein the magnitude of the resilient elongation of said side portions is in the range of approximately 3 percent to approximately 15 percent elongation.

6. The improvement is claimed in claim 1 wherein said natural form includes said side portions having a longitudinal extent shorter than the longitudinal extent of said central portion intermediate thereof.

7. The improvement as claimed in claim 6 wherein said elongated deformable portion includes an elongated concavity having a longitudinal curvature and said elongated concavity opens generally inwardly toward the center of said longitudinal curvature when said longitudinally extending portion assumes said natural form.

8. The improvement as claimed in claim 5 wherein said elongated concavity includes a cross sectional profile thereof defined by the transverse extent of said central portion and the transverse extent of said side portions extending transversely therefrom.

9. The improvement as claimed in claim 6 wherein the extent of said side portions from said central portion in the direction of the radius R of said longitudinal curvature defines the depth D of said concavity, and the magnitude of the ratio R/D is approximately 11.

10. In an elongated longitudinally extendable conveying element assembly adapted to be longitudinally tensioned for mounting thereof on a carrier means, the combination comprising:
an elongated body member which is longitudinally stretchable from a relaxed state thereof;
an elongated flexible tension bearing means longitudinally coextensive with said body member and including a serial plurality of flexibly interconnected tandem pairs of connected tension elements;
certain of said tandem pairs of connected tension elements including connecting means which permit longitudinal movement of the respective connected tension elements relative to one another and further including respective tandem pairs of securing means by which said tension bearing means is secured to said body member;
each said tandem pair of securing means being spaced apart by a distance which is variable between a minimum spacing and a maximum spacing in conjunction with said longitudinal movement of the respective connected tension elements relative to one another;
said body member including a plurality of longitudinally spaced securing portion pairs which are cooperable with respective said tandem pairs of securing means and are located in a manner that the longitudinal spacing between said securing portion pairs when said body member is in such relaxed state is smaller than said maximum spacing and at least as large as said minimum spacing of the respective said tandem pairs of securing means such that when the respective said securing means assume said maximum spacing in response to such relative longitudinal movement of said certain tandem pairs of connected elements said body member is stretched longitudinally to provide a maximum longitudinal extension of said conveying element.

11. The conveying element assembly as claimed in claim 10 wherein said tension bearing means includes a roller chain.

12. The conveying element assembly as claimed in claim 11 wherein said connecting means permits a predetermined freeplay between selected pairs of links of said roller chain.

13. The conveying element assembly as claimed in claim 12 wherein said predetermined freeplay includes freeplay in the pivotal connection means which cooperates with a connecting link to connect said selected pairs of links of said roller chain.

14. The conveying element assembly as claimed in claim 13 wherein said connection means is a pair of longitudinally spaced pivotal connections and said freeplay is approximately ten percent of the longitudinal distance between the respective pairs of said pivotal connections.

15. The conveying element assembly as claimed in claim 12 wherein alternate links of said roller chain include said securing means.

16. The conveying element assembly as claimed in claim 15 wherein each said alternate link of said roller chain is pivotally connected to the intervening link therebetween.

17. The improvement as claimed in claim 1 wherein said side portions are flexibly hinged to said central portion by an intervening longitudinally extending hinge portion of said conveying element.

18. The improvement as claimed in claim 17 wherein said conveying element includes plural layers of reinforcing elements extending transversely through said side portions, said central portion, and said intervening hinge portions.

19. The improvement as claimed in claim 18 wherein said layers of reinforcing elements are positioned relatively more proximate each other in said hinge portions than in said central and said side portions.

* * * * *